United States Patent
Rao et al.

(10) Patent No.: US 11,811,567 B1
(45) Date of Patent: Nov. 7, 2023

(54) SERIAL DATA RECEIVER WITH DECISION FEEDBACK EQUALIZER WITH FEED FORWARD TECHNIQUE

(71) Applicant: Apple Inc., Cupertino, CA (US)

(72) Inventors: Battaje Vimalesh Rao, San Diego, CA (US); Jacob S. Schneider, San Diego, CA (US); Mitesh D. Katakwar, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/931,090

(22) Filed: Sep. 9, 2022

(51) Int. Cl.
*H04L 25/03* (2006.01)

(52) U.S. Cl.
CPC .. *H04L 25/03038* (2013.01); *H04L 25/03057* (2013.01)

(58) Field of Classification Search
CPC ............. H04L 25/03038; H04L 25/03057
See application file for complete search history.

(56) References Cited

U.S. PATENT DOCUMENTS

| | | | | |
|---|---|---|---|---|
| 8,212,706 B1* | 7/2012 | Lin | ......................... | H03M 1/42 |
| | | | | 341/120 |
| 9,577,771 B1* | 2/2017 | Lashkarian | ............... | H03F 3/19 |
| 10,880,042 B1 | 12/2020 | Katakwar et al. | | |
| 2002/0057731 A1* | 5/2002 | Schilling | ............... | H04L 1/0045 |
| | | | | 375/152 |
| 2005/0047040 A1* | 3/2005 | Naffziger | ................. | H03K 5/08 |
| | | | | 361/90 |
| 2005/0201491 A1* | 9/2005 | Wei | ....................... | H04L 7/0337 |
| | | | | 375/326 |
| 2006/0256892 A1* | 11/2006 | Momtaz | ................ | H04L 25/061 |
| | | | | 375/317 |
| 2008/0107168 A1 | 5/2008 | Xia et al. | | |
| 2008/0310495 A1 | 12/2008 | Bulzacchelli et al. | | |
| 2013/0142244 A1 | 6/2013 | Tan | | |
| 2015/0288545 A1* | 10/2015 | Schell | ............... | H04L 25/03057 |
| | | | | 375/233 |
| 2021/0398575 A1* | 12/2021 | Kuang | ................. | G11C 29/023 |

* cited by examiner

*Primary Examiner* — Janice N Tieu
(74) *Attorney, Agent, or Firm* — Kowert, Hood, Munyon, Rankin & Goetzel, P.C.; Erik A. Heter; Dean M. Munyon

(57) ABSTRACT

A serial data receiver is disclosed. In one embodiment, a receiver includes an amplifier circuit configured to receive one or more signals that encode a serial data stream that includes a plurality of data symbols and to perform a comparison of the one or more signals to a threshold value to generate a recovered data symbol. The receiver circuit further includes a threshold circuit configured to generate a delayed version of the one or more signals. The threshold circuit is further configured to generate a delayed data symbol using the delayed version of the one or more signals and adjust the threshold value using the delayed data symbol.

20 Claims, 8 Drawing Sheets

SERIAL DATA RECEIVER WITH DECISION FEEDBACK EQUALIZER WITH FEED FORWARD TECHNIQUE

BACKGROUND

Technical Field

This disclosure is directed to communications systems, and more particularly, to receiver circuits in communications systems.

Description of the Related Art

High-speed communications systems are increasingly common in various devices. Such systems transmit data at high speeds across a communications link. Many such systems transmit data serially, although high-speed parallel communications system are used in many applications.

To ensure data is transferred correctly and without errors, various techniques are used. For example, decision feedback equalization is used to reduce distortion produced by inter-symbol interference (ISI) by evaluating a currently received symbol based on one or more previously received symbols. Many other techniques are utilized as well.

SUMMARY

A serial data receiver is disclosed. In one embodiment, a receiver includes an amplifier circuit configured to receive one or more signals that encode a serial data stream that includes a plurality of data symbols and to perform a comparison of the one or more signals to a threshold value to generate a recovered data symbol. The receiver circuit further includes a threshold circuit configured to generate a delayed version of the one or more signals. The threshold circuit is further configured to generate a delayed data symbol using the delayed version of the one or more signals and adjust the threshold value using the delayed data symbol.

In one particular (non-limiting) embodiment, the threshold circuit effectively acts as a decision feedback equalization (DFE) circuit that implements DFE using a feed forward technique. For example, an embodiment of a threshold circuit may be implemented using a Schmitt trigger circuit and a logic circuit. The Schmitt trigger and the amplifier may concurrently receive an incoming signal having a plurality of symbols therein. While the amplifier processes the incoming signal, the Schmitt trigger may generates a delayed version (or delayed complement) of the incoming signal. A logic circuit coupled to the output of the Schmitt trigger may receive the delayed version of the incoming signal and generate a threshold adjustment signal. The logic circuit may then adjust the threshold of the amplifier. Using the adjusted threshold, the amplifier may evaluate the next incoming symbol based on the value of previous symbol.

BRIEF DESCRIPTION OF THE DRAWINGS

The following detailed description makes reference to the accompanying drawings, which are now briefly described.

DETAILED DESCRIPTION OF EMBODIMENTS

Many digital communications systems use decision feedback equalization (DFE) in receivers to compensate for distortion caused by inter-symbol interference (ISI). Thus, many receivers use DFE circuits that utilize the history of previously received symbols to evaluate a currently received symbol.

In prior art DFE circuits, certain conditions can occur that cause the output to oscillate. In particular, if the input rise/fall time is greater than the period of oscillation or if the input voltage is held between 0 and the supply voltage for a sufficient amount of time. To put it another way, oscillation occurs if the feedback signal reaches the input to change the trip point/threshold before the output has fully settled. One solution to the problem could be to add a delay to the feedback path. However, controlling the delay requires more power consumption.

The present disclosure makes use of the insight that if the shifting of the threshold could be delay to allow the output to fully settle, the oscillation could be eliminated. Accordingly, the present disclosure contemplates a receiver circuit having a feedforward path that delays the shifting of the threshold. Instead of the traditional feedback to implement DFE, a feed-forward path having a hysteresis circuit (e.g., a Schmitt trigger) between the input pad and the inverter is implemented. The hysteresis circuit, using the history of the most recently received symbol, delays the changing of the threshold for the next symbol until after the output has been provided enough time to settle. The use of the hysteresis circuit allows implementation of DFE without actually providing a feedback loop from the output. Instead, the history of the previous symbol is effectively captured by the hysteresis circuit to implement the feedback function. This results in a receiver circuit that can effectively implement DFE while eliminating the oscillation described above. The receiver circuit may also consume less power in comparison with circuits that delay feedback from the output. Furthermore, the eye for received signals may be greater as well relative to receivers that utilize traditional feedback in implementing DFE.

The present disclosure is now discussed in further detail, beginning with embodiments of a receiver circuit. A schematic diagram of an embodiment of a receiver circuit is then discussed, followed by a timing diagram of its operation. Methods for operating a receiver circuit in accordance with the disclosure are then discussed. An example communications system is then described, followed by that of example systems in which it may be implemented.

Figure 1:
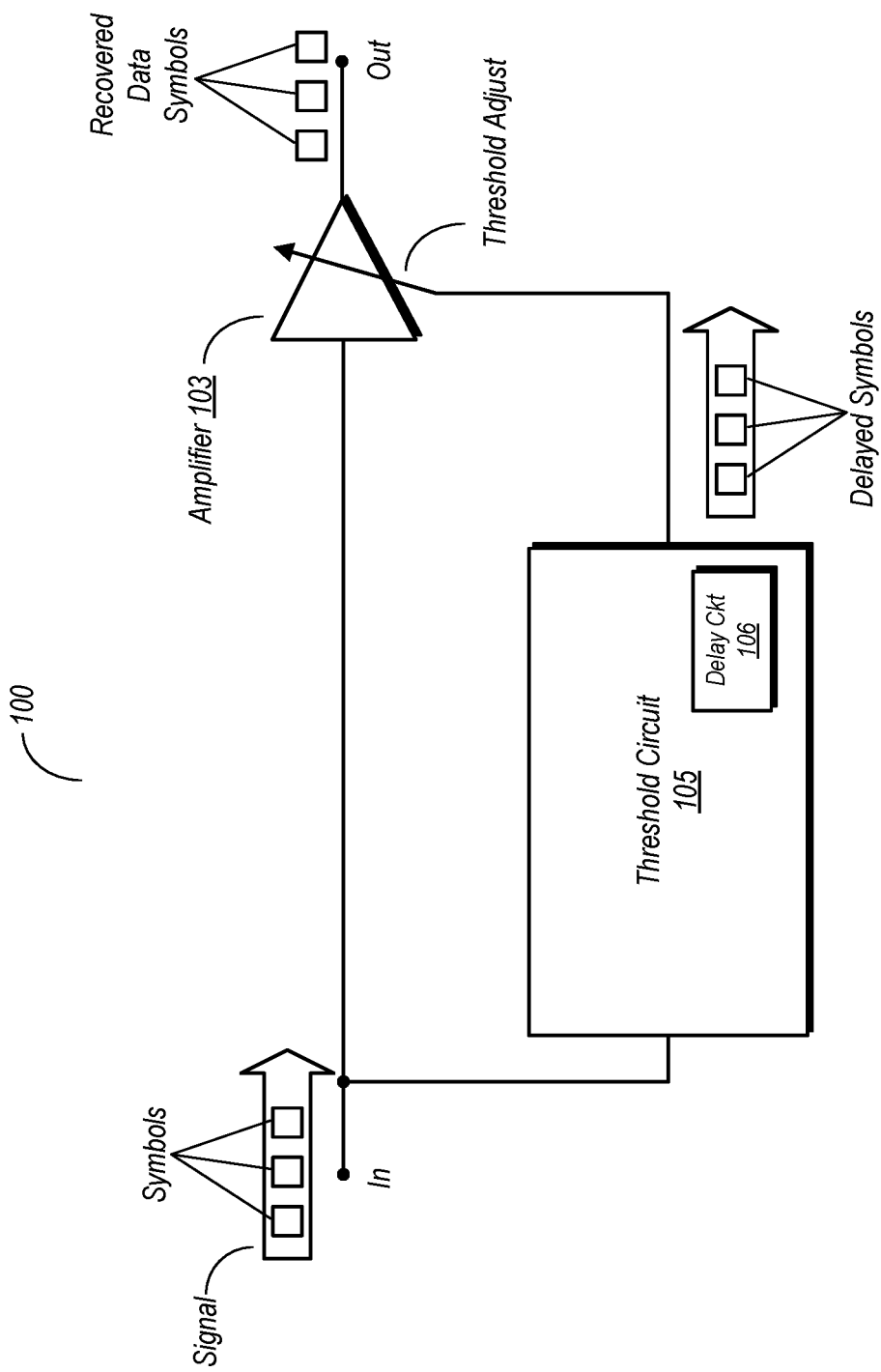
FIG. 1 is a diagram of one embodiment of a receiver.

Receiver Circuit with DFE Implemented Using Feed Forward Technique:

Turning now to FIG. 1, a block diagram of one embodiment of a receiver is shown. In the embodiment shown, receiver 100 includes an amplifier circuit 103 and a threshold circuit 105. Amplifier 103 in the embodiment shown is configured to receive signals that encode a serial data stream that includes a plurality of data symbols. The values of these symbols are determined using an adjustable threshold value.

The one or more signals are compared to the threshold value in order to generate recovered data symbols. The threshold used by amplifier 103 at any particular time is determined by threshold circuit 105.

Threshold circuit 105 in the embodiment shown is coupled to receive the signals containing data symbols concurrently with amplifier 103, and is configured to generate a delayed version of the received signals, using delay circuit 106. Using the received signals, threshold circuit 105 generates a delayed data symbols. Using the delayed data symbols, threshold circuit 105 in the embodiment shown adjusts the threshold value used as a basis of comparison by amplifier 103. In this manner, receiver 100 implements DFE using a feed-forward technique that delays the data symbols such that the threshold used by amplifier 103 for evaluating a particular symbol is based on the history of at least one previous symbol.

Delay circuit 106 in the embodiment shown may be one of a number of different types of circuits. Generally speaking, delay circuit 105 may use some form of hysteresis to generate a lockout period that holds the threshold at a particular value while amplifier 103 evaluates a signal to recover a data symbol. This in turn may prevent oscillation that may occur in previous receivers in which the feedback signal causes a change of the threshold before the amplifier has fully settled. Generating a lockout period using the delay circuit 106 thus allows time for the output signal to settle, without oscillation, and thus provide an accurately recovered data symbol.

Figure 2:
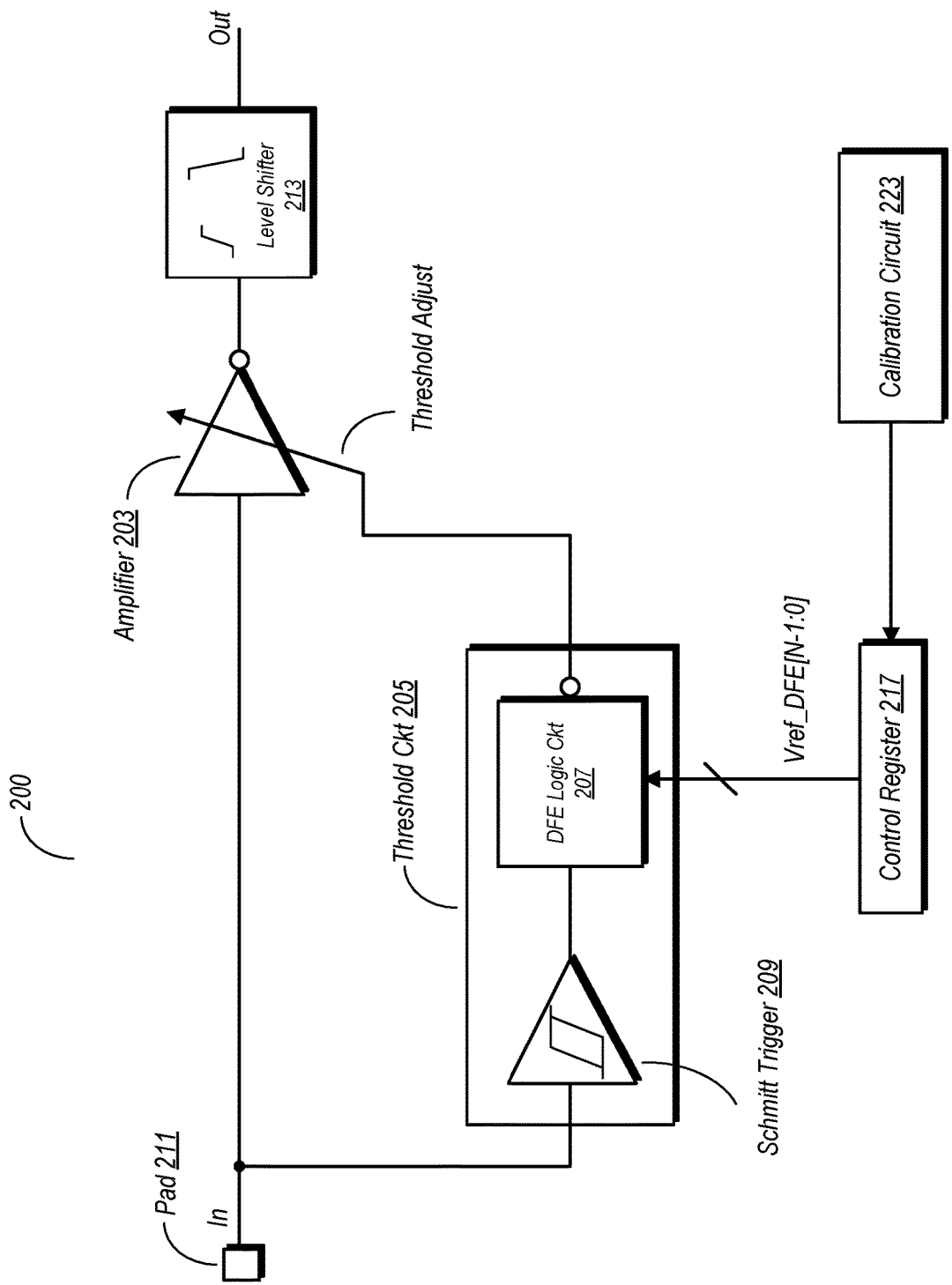
FIG. 2 is a diagram of another embodiment of a receiver.

FIG. 2 is a block diagram of another embodiment of a receiver circuit. More particularly, receiver 200 is a more detailed version of an embodiment of receiver 100 as shown in FIG. 1, although it is to be understood that the embodiment of FIG. 2 is not intended to be limiting.

In the embodiment shown in FIG. 2, an input signal may be received via pad 211, with recovered data symbols being provided via a level shifter 213 coupled to the output node, Out. Amplifier 203 in the embodiment shown may be similarly configured to that shown in FIG. 1, and may compare incoming signals to an adjustable threshold to recover and provide output data symbols.

Threshold circuit 205 in the embodiment shown includes a Schmitt trigger 209 and a DFE logic circuit 207. Schmitt trigger 209 in the embodiment shown provides, through history, delay for threshold circuit 205. One of a number of different types of circuits may be used to implement Schmitt trigger 209. In one embodiment, Schmitt trigger 209 may be implemented as a classic MOSFET Schmitt trigger circuit. Embodiments in which Schmitt trigger 209 is implemented using bipolar transistors or various non-inverting amplifier configurations are also possible and contemplated. Generally speaking, Schmitt trigger 209 may be implemented in any suitable circuit configuration to achieve the desired operation of threshold circuit 209.

The output of Schmitt trigger 209 is provided to DFE logic circuit 207. In the embodiment shown, DFE logic circuit 207 is configured to for a currently received symbol, select the next threshold value for amplifier 103 based on the delayed data symbol received from Schmitt trigger 209 and an N-bit input code, Vref_DFE[N−1:0] received from control register 217. The input code may be any integer number of bits, N, and may depend on the particular arrangement of DFE logic circuit 207.

In some embodiments, the input code may be a static code that is input into control register 217 at, e.g., startup time, manufacture time, or any other suitable time. In other embodiments, control register 217 may be a dynamic code that may be updated from time to time during operation of receiver 200. In this particular embodiment, a calibration circuit 223 is coupled to control register 217 and is configured to provide the input code thereto based on a calibration operation. Calibration circuit 223 may also be coupled to other circuits and may be configured to carry out various functions that cause a calibration to be performed. Such calibrations may include receiver 200 receiving input signals and evaluating the recovered symbols vs. some expected value. Calibrations may be performed on a periodic basis and/or at other times, such as during a change of a performance state (supply voltage and/or clock frequency) of the system in which receiver 200 is implemented.

The output of DFE logic circuit 207 in the embodiment shown may be one or more signals that control the threshold value that amplifier 203 uses to evaluate incoming signals in order to recover symbols therefrom. The threshold at any given time in the embodiment shown is dependent on at least one previously received symbol. For example, in a binary system, if the previous symbol occurred as a result of a low-to-high transition, the threshold may be set to a first value that is greater than the midpoint between a reference voltage and a supply voltage provided to the amplifier. Thus, for a high-to-low transition that occurs subsequent to the low-to-high transition, the output of amplifier 203 will switch responsive to the signal voltage falling below the first threshold. If the previous symbol occurred as a result of a high-to-low transition, the threshold value may be set by DFE logic circuit 207 to a second value that is less than the first value and lower than the midpoint between the reference voltage and the supply voltage. Thus, for a subsequent low-to-high transition, the output of amplifier 203 will switch as soon as the signal voltage crosses the second threshold.

In some embodiments, the signal voltages may be different than the supply voltage of circuits downstream from receiver 200. Accordingly, the embodiment shown in FIG. 2 includes a level shifter 213, which is configured to level-shift the output signal from amplifier 203 to the voltage domain of the downstream circuits.

Figure 3:
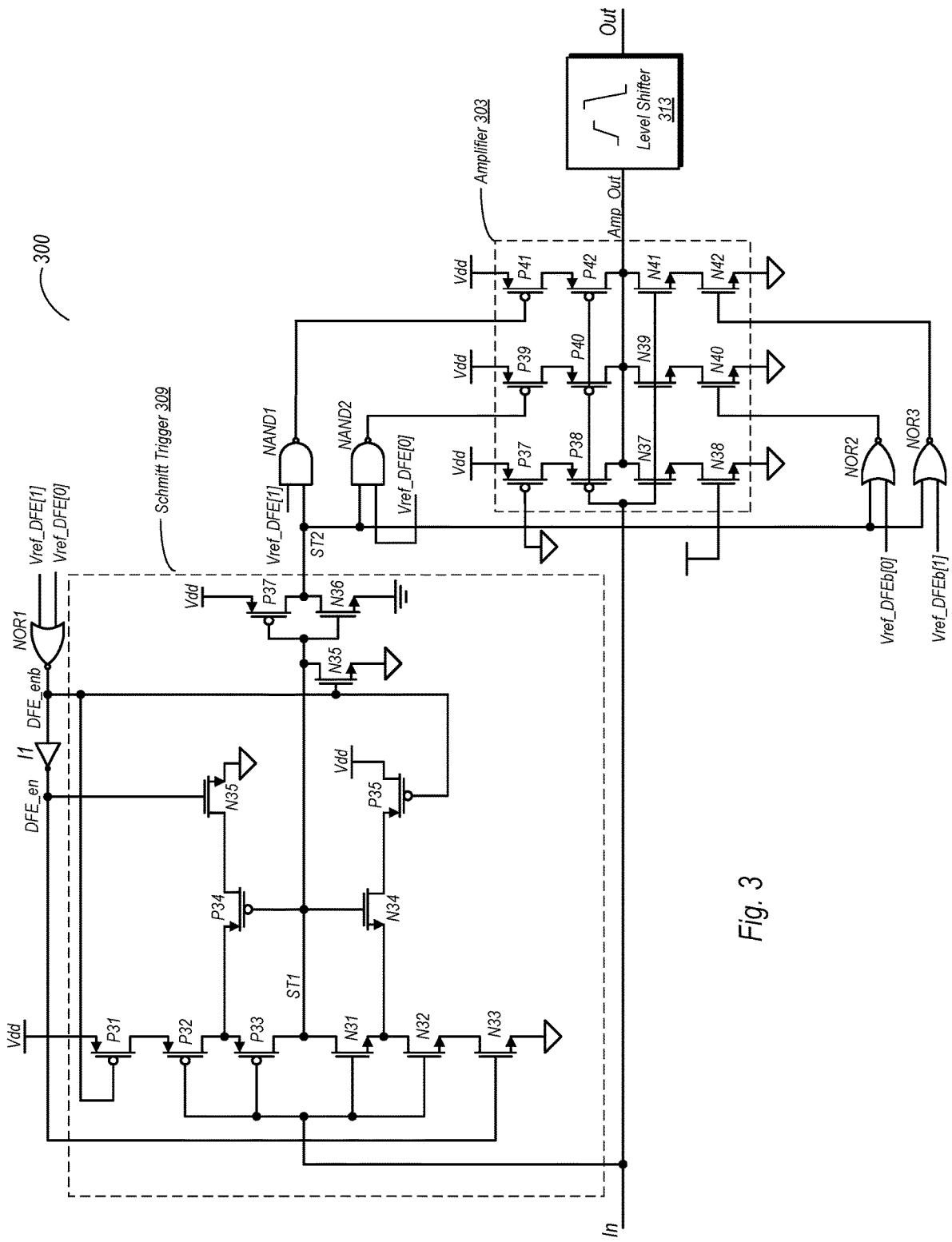
FIG. 3 is a schematic diagram of one embodiment of a receiver.

FIG. 3 is a schematic diagram of one embodiment of a receiver. In the embodiment shown, receiver 300 includes a Schmitt trigger 309, an amplifier 303, and a level shifter 313. A DFE logic circuit is also implemented using logic gates NAND1, NAND2, NOR1, NOR2 and NOR3. These logic gates are each coupled to receive an input code, which is two bits in this particular embodiment, although other embodiments arranged for different sized codes are possible and contemplated.

The input code in this embodiment comprises Vref_DFE[1:0]. These bit are input into NOR1, and if at least one of them is a logic 1, the output DFE_enb is low, while inverter I1 generates DFE_en as a logic high. These signals, DFE_en as a logic high and DFE_enb as a logic low, operate as DFE enable signals to enable Schmitt trigger 309 to carry out its functions in performing DFE for receiver 300. When DFE_en is low and DFE_enb is high, and thus Schmitt trigger 309 is not enabled, signals may pass through receiver 300 with no DFE performed thereon. Additionally, when DFE is not enabled, N35 is activated to pull node ST1 low.

Schmitt trigger 309 includes a pull-up stack comprising transistors P31, P32, and P33, and a pull-down stack comprising transistors N31, N32, and N33. Of these devices, P32 and P33 in the pull-up stack and N31 and N32 in the pull-down stack have respective gate terminals coupled to receive the input signal. Transistor N33 is coupled to receive the DFE_en signal on its respective gate terminal, while transistor P31 is coupled to receive the DFE_enb signal on its respective gate terminal. The pull-up and pull-down stacks, when enabled, operate to perform a strong inversion of the input signal on the ST1 node.

When node ST1 is pulled low by the pull-down stack, P34 is activated. Since N35 is active due to the high on DFE_en, a pull-down path is provided between the drain terminal of P32 and ground. When ST1 is pulled high by the pull-up stack, N34 is activated, thereby generating a pull-up path between the drain terminal of N32 and the supply voltage node VDD.

Schmitt trigger 309 also includes an inverter comprising N356 and P37, which inverts the signal on ST1 to produce the complementary value on node ST2. The value of ST2 is provided as an input to logic gates NAND1, NAND2, NOR2, and NOR3. Logic gate NAND1 is coupled to receive Vref_DFE[1] as a second input, while the complementary value Vref DFEb[1] is provided as the second input to NOR3. Logic gate NAND2 is coupled to receive Vref_DFE[0] as its second input, while its complement Vref DFEb[0] is provided as the second input to NOR2. Due to the arrangement of Schmitt trigger 309 relative to amplifier 303, the logic value of ST2 may correspond to a previously recovered symbol relative to the value that is received on the input of amplifier 303.

Amplifier 303 in the embodiment shown includes three pull-up stacks, the first comprising P37 and P38, the second comprising P39 and P40, and the third comprising P41 and P42. Amplifier 303 further includes three pull-down stacks, the first comprising N37 and N38, the second comprising N39 and N40, and the third comprising N41 and N42. The first pull-up stack and the first pull-down stack are arranged such that they may be activated irrespective of whether DFE is enabled at a particular time. The other pull-up and pull-down stacks may be enabled depending on the states of the output signals of NAND1, NAND2, NOR2 and NOR3. When DFE is enabled, the output signals of the logic gates, which are based on the input code and the current state of ST2, is based on a previously received symbol. These output values enable or disable correspondingly coupled pull-up/pull-down stacks, and thus set the threshold for amplifier 303 to evaluate a signal currently received on its input, and thus recover a symbol therefrom. Depending on the input code Vref_DFE[1:0], anywhere from one to three of the pull-up/pull-down stacks may be active at a given time, thereby setting a threshold value. The Amp_Out node is thus based on the voltage of the input signal and the threshold set per the operation described above. The Amp_Out signal is then provided to level shifter 313, which in turn provide the level-shifted output signal, Out.

Figure 4:
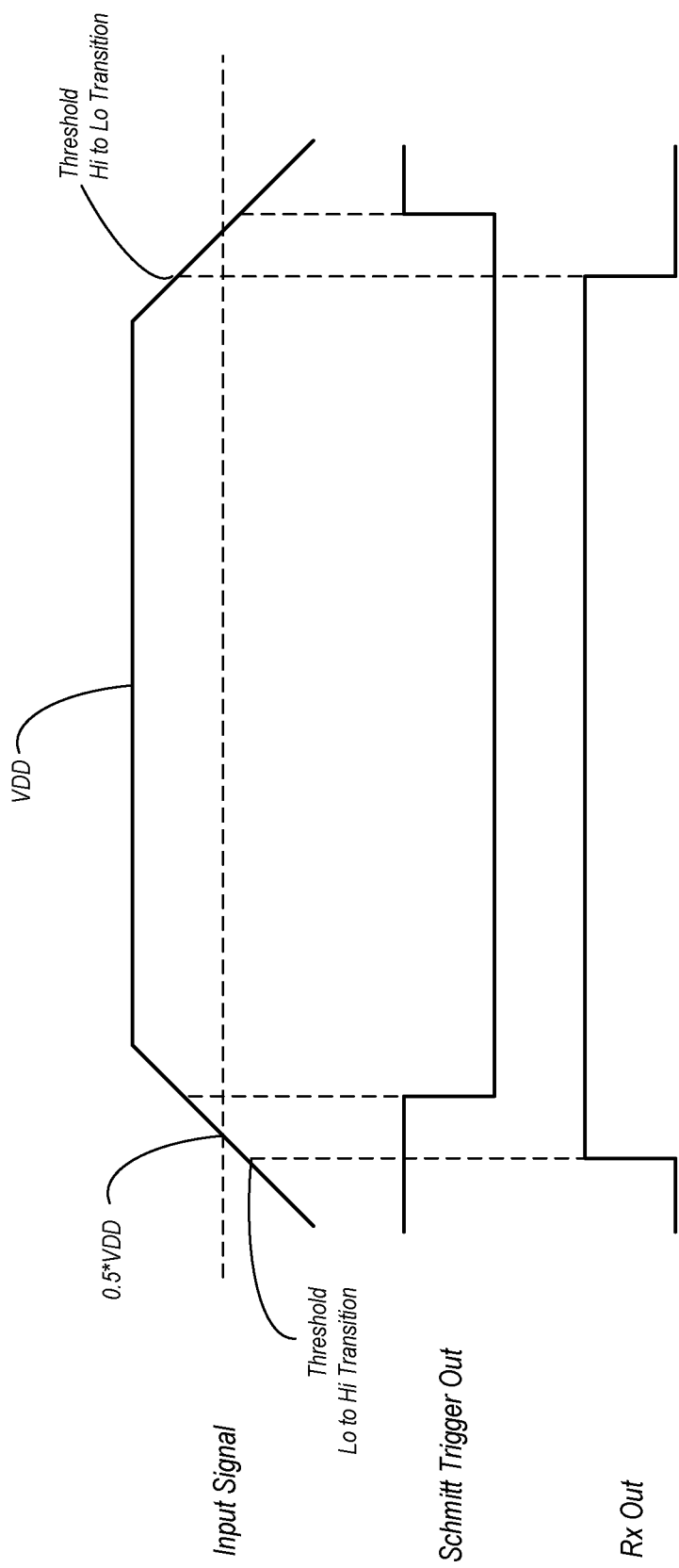
FIG. 4 is a timing diagram of the operation of one embodiment of a receiver.

Timing Diagram:

FIG. 4 is a timing diagram illustrating the operation of one embodiment of a receiver in accordance with this disclosure. The operation illustrated by FIG. 4 may be carried out by any of the receiver embodiments discussed above.

In the illustrated example, the input signal makes an initial transition from low to high (VDD). The threshold at this time is set for the low-to-high transition, and is less than 0.5*VDD. When the input signal crosses this value, the receiver output, Rx Out, transitions from low to high. Due to hysteresis, the Schmitt trigger output is delayed in transitioning, but eventually falls low at some point after Rx Out transitions high. This delay between the time the input signal crosses the low-to-high threshold and the high-to-low transition of Schmitt Trigger Out allows sufficient time for settling of Rx Out and thus prevents oscillation that can occur in previous receivers using DFE. Furthermore, when Schmitt Trigger Out falls low, the switching threshold for the amplifier is adjusted to the High-to-Low threshold, which is greater than 0.5*VDD. At a subsequent time, when the input signal falls low, Rx Out falls low as the input signal crosses the High-to-Low threshold. The Schmitt Trigger Out signal transitions from low to high at a delay/hysteresis time thereafter. In the delay time between the input signal falling below the High-to-Low threshold and the transitioning from low to high of Schmitt Trigger Out, the amplifier is provided sufficient time to allow Rx Out to settle without oscillation.

Methods for Operating a Communications Subsystem

Figure 5:
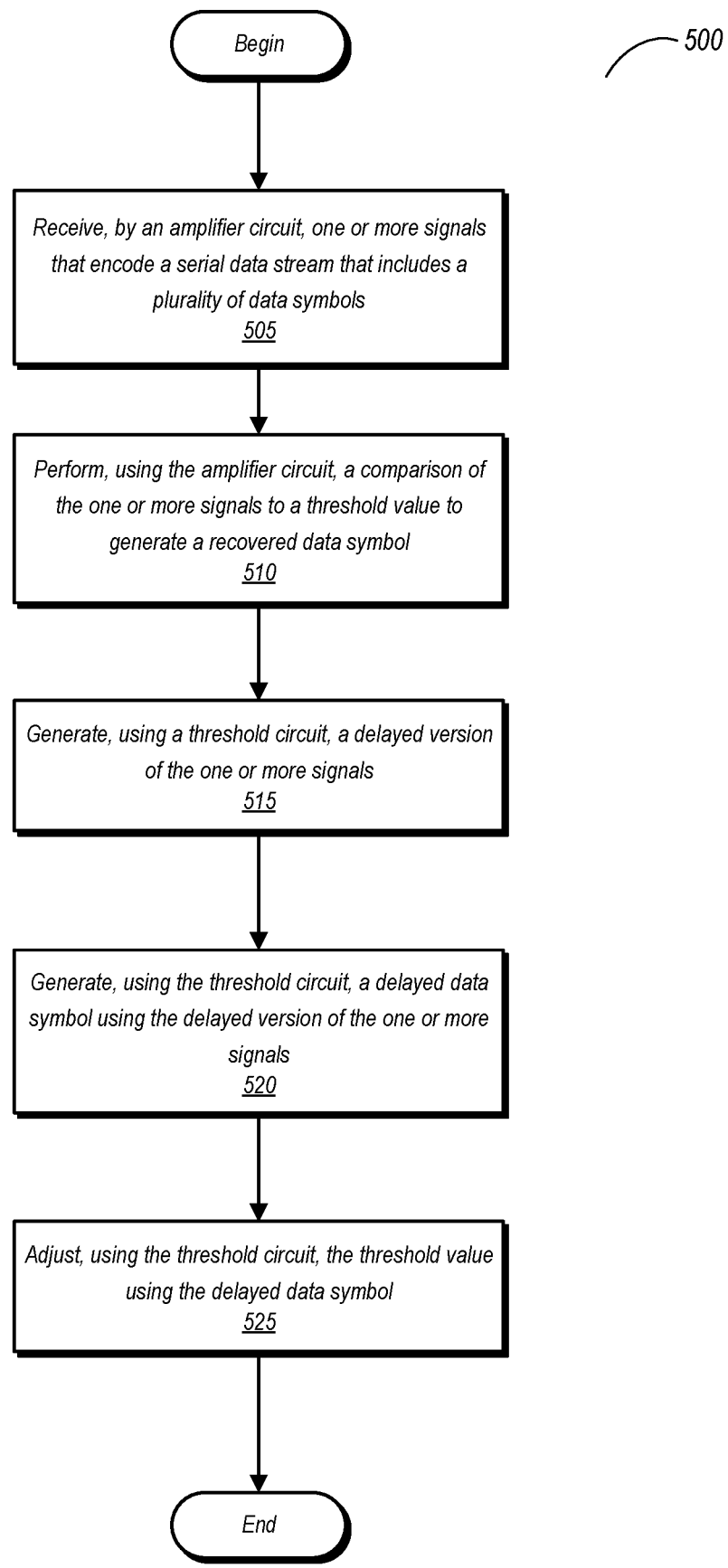
FIG. 5 is a flow diagram illustrating an embodiment of a method for operating a receiver.

FIG. 5 is a flow diagram of one embodiment of a method for operating a communications system. Method 500 as illustrated in FIG. 5 may be carried out by any of the receivers discussed herein. Embodiments of a receiver that is capable of carrying out Method 500, but not explicitly disclosed herein, is also considered to fall within the scope of this disclosure.

Method 500 includes receiving, by an amplifier circuit, one or more signals that encode a serial data stream that includes a plurality of data symbols (block 505). The method further includes performing, using the amplifier circuit, a comparison of the one or more signals to a threshold value to generate a recovered data symbol (block 510). Concurrent with the above, Method 500 includes generating, using a threshold circuit, a delayed version of the one or more signals (block 515), and generating, using the threshold circuit, a delayed data symbol using the delayed version of the one or more signals (block 520). Thereafter, Method 500 includes adjusting, using the threshold circuit, the threshold value using the delayed data symbol.

The threshold circuit includes, in various embodiment, a delay circuit and a logic circuit. In a receiver configured as such, the method further includes producing the delayed data symbol, using the delay circuit, wherein producing the delayed data symbol includes the delay circuit providing hysteresis to the one or more signal and selecting a threshold value for a currently received data symbol using the logic circuit based on the delayed data symbol and an input code. The input code may be stored in a register, and thus embodiments of method may further include providing the input code, from a register, to the logic circuit. In some embodiments, the input code is a static code that is set at, e.g., startup time or more generally, sometime prior to normal operations. The method may further include performing a calibration to update the input code, which may be carried out on a periodic basis.

Embodiments of the method may further include the threshold circuit changing the threshold level from a first level to a second level at a first delay time subsequent to a transition of a recovered data symbol from a first logic value to a second logic value. Such embodiments of the method further include the threshold circuit changing the threshold level from the second level to the first level at a second delay time subsequent to a transition of the recovered data symbol from the second logic value to the first logic value.

Figure 6:
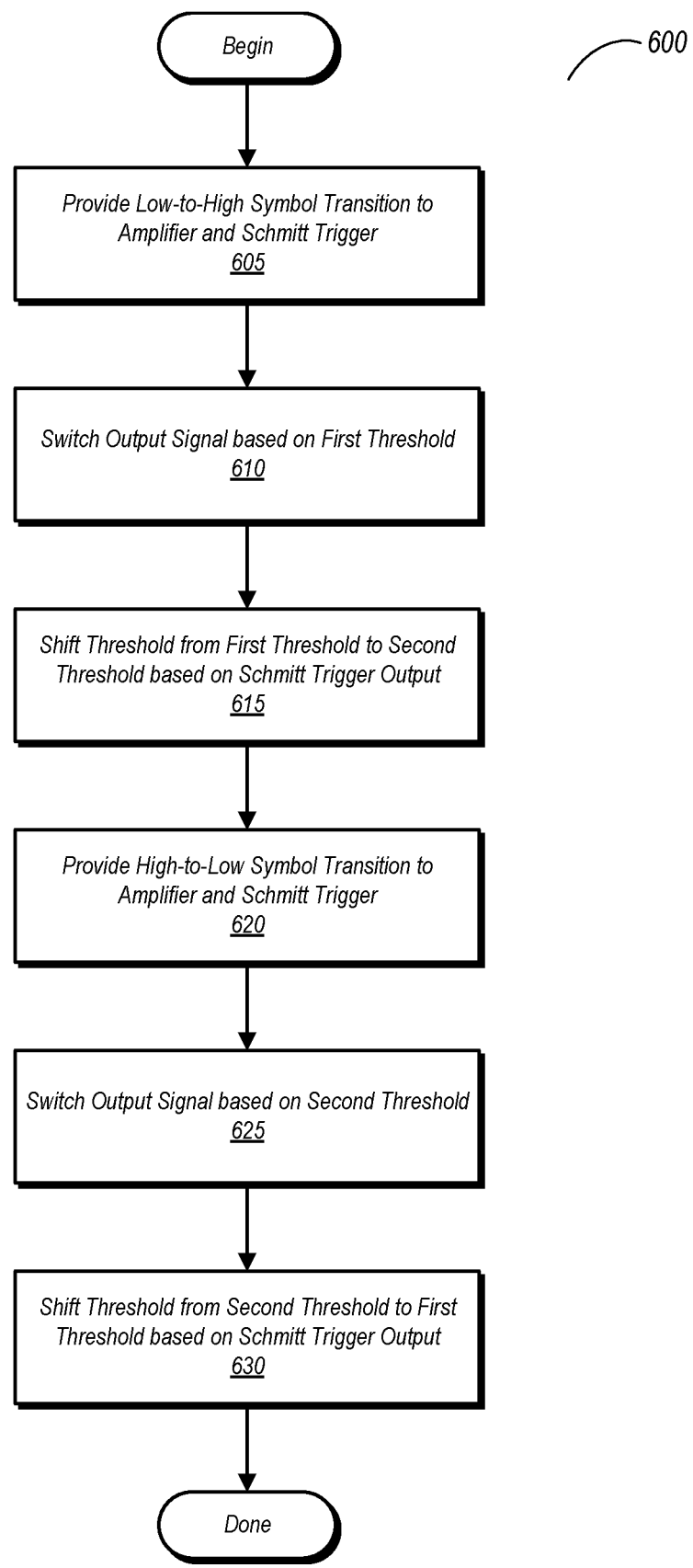
FIG. 6 is a flow diagram illustrating another embodiment of a method for operating a receiver.

FIG. 6 is a flow diagram of another embodiment of a method for operating a receiver. Method 600 may be carried out by embodiments of a receiver such as those shown in FIGS. 2 and 3. Receiver embodiments not explicitly disclosed herein that are nevertheless capable of carrying out Method 600 are also considered to fall within the scope of this disclosure.

Method 600 begins with providing a low-to-high (e.g., logic 0 to logic 1) symbol transition to an amplifier and a Schmitt trigger of a receiver circuit (block 605). The method further includes the amplifier switching the state of the amplifier output signal, in response to the low-to-high transition, based on a first threshold that is set by a threshold circuit that includes the Schmitt trigger (block 610). After receiving the low-to-high transition, the Schmitt trigger causes the threshold circuit to switch the threshold of the amplifier from the first threshold to a second threshold (block 615). The switching from the first threshold to the second threshold occurs after the amplifier has already responded to the low-to-high symbol transition.

At some point following the changing of the threshold, a high-to-low symbol transition occurs and is provided to the amplifier and the Schmitt trigger (block 620). In response to receiving the high-to-low symbol transition, the amplifier switches its output based on the second threshold (block 625). At some time thereafter, based on the output of the Schmitt trigger, the threshold circuit cause the amplifier threshold to change from the second threshold to the first threshold.

Figure 7:
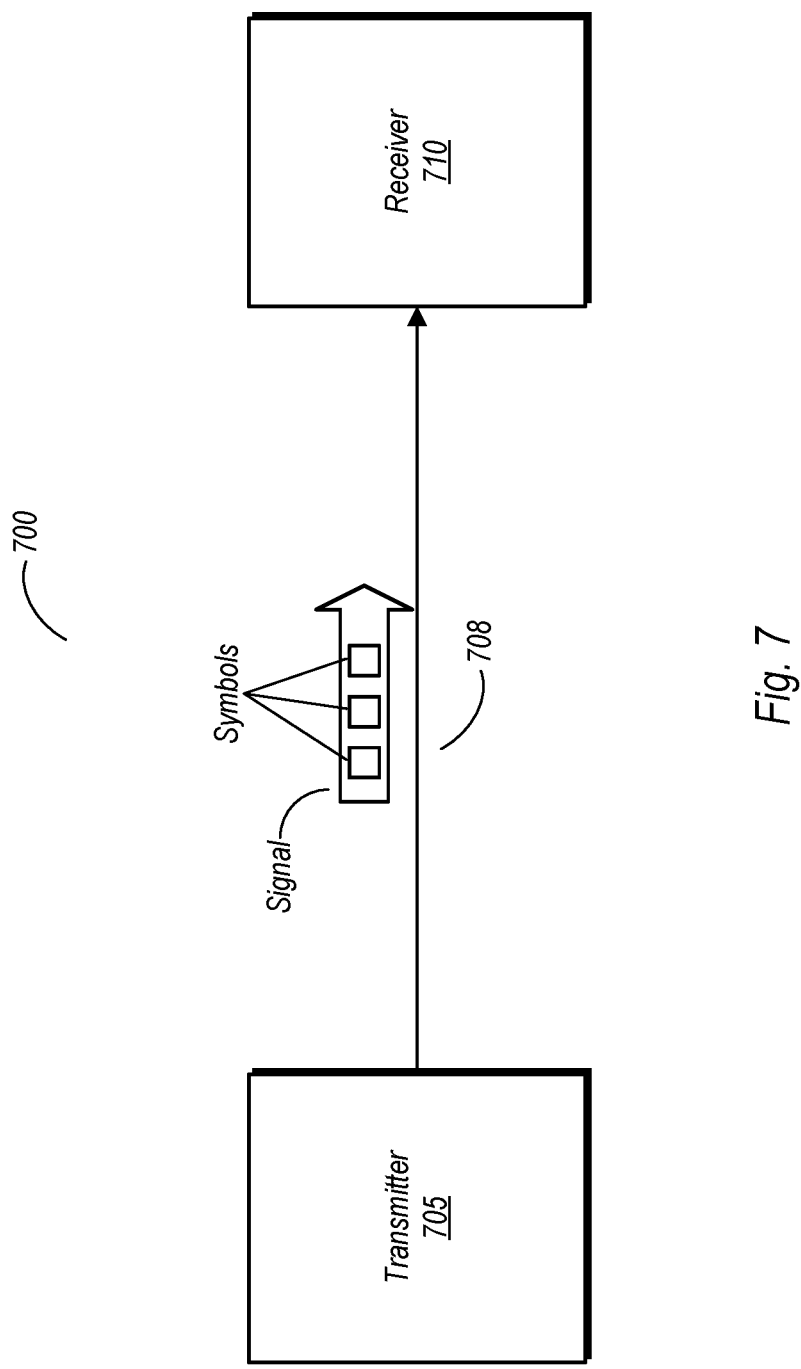
FIG. 7 is block diagram illustrating one embodiment of a communications system.

Communications System:

FIG. 7 is a block diagram of one embodiment of a communications system that may utilize a receiver as disclosed herein. In the embodiment shown, system 700 includes a transmitter 705 and a receiver 710. The receiver may implement DFE using the various techniques described herein, such as those described with reference to FIGS. 1-4. It is noted that, while the system illustrated here is unidirectional, bi-directional systems are also possible and contemplated, with a transmitter and a receiver on each side of the link 708.

The system as shown in FIG. 7 may be one of a number of different types. For example, system 700 may implement a link between a memory controller and a memory in one embodiment. Embodiments of various point-to-point communications systems between, e.g., a system-on-a-chip (SoC) and a peripheral device are also possible and contemplated. Intra-chip communications links are also possible and contemplated within the scope of this disclosure. In general, communication system 700 may be any type of system that implements DFE at a receiver in the manner described above.

Figure 8:
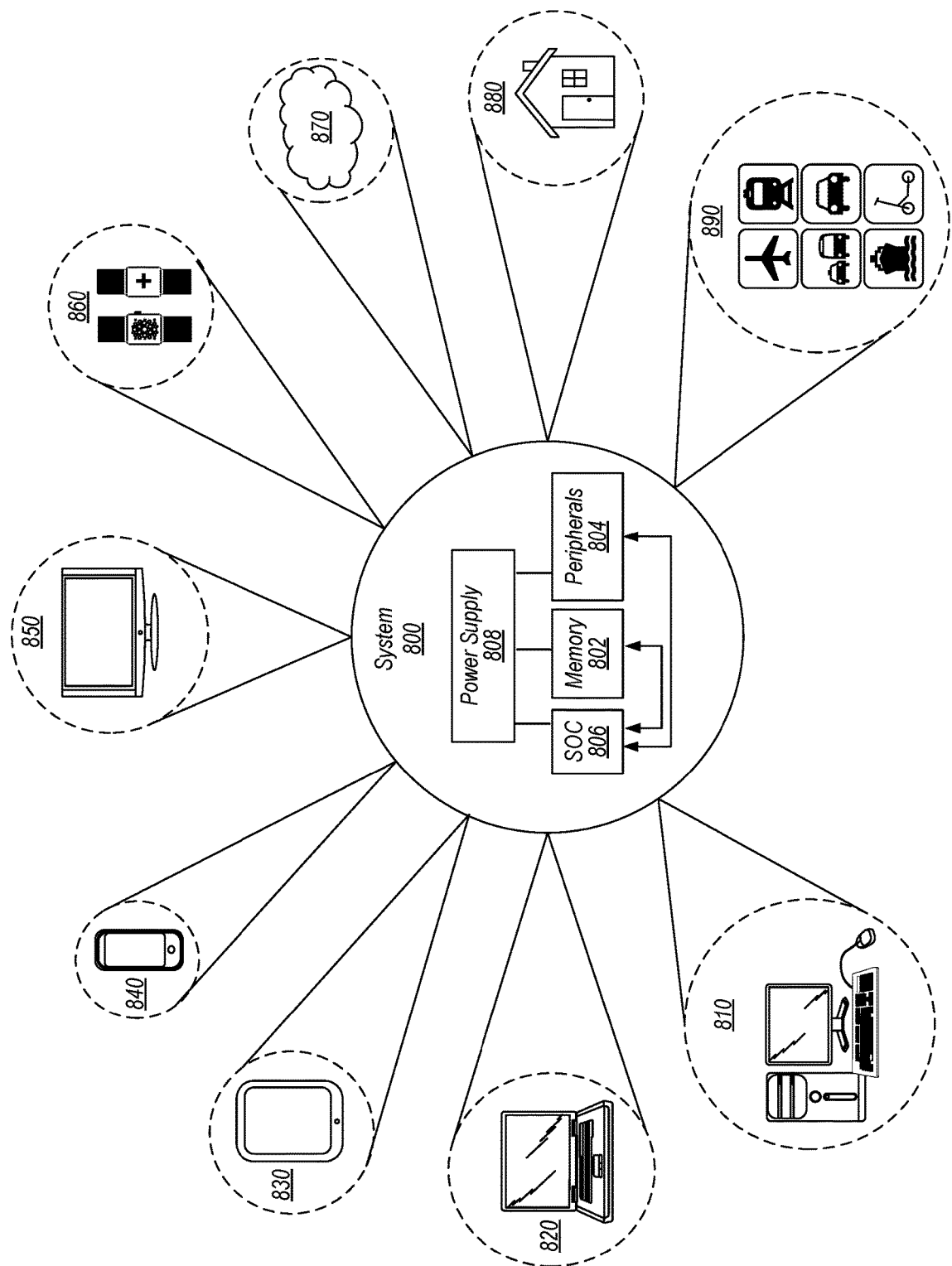
FIG. 8 is a block diagram illustrating embodiments of an example system.

Example System:

Turning next to FIG. 8, a block diagram of one embodiment of a system 800 is shown that may incorporate and/or otherwise utilize the methods and mechanisms described herein. In the illustrated embodiment, the system 800 includes at least one instance of a system on chip (SoC) 806 which may include multiple types of processing units, such as a central processing unit (CPU), a graphics processing unit (GPU), or otherwise, a communication fabric, and interfaces to memories and input/output devices. In some embodiments, one or more processors in SoC 806 includes multiple execution lanes and an instruction issue queue. In various embodiments, SoC 806 is coupled to external memory 802, peripherals 804, and power supply 808.

A power supply 808 is also provided which supplies the supply voltages to SoC 806 as well as one or more supply voltages to the memory 802 and/or the peripherals 804. In various embodiments, power supply 808 represents a battery (e.g., a rechargeable battery in a smart phone, laptop or tablet computer, or other device). In some embodiments, more than one instance of SoC 806 is included (and more than one external memory 802 is included as well).

The memory 802 is any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices are coupled onto a circuit board to form memory modules such as single inline memory modules (SIMMs), dual inline memory modules (DIMMs), etc. Alternatively, the devices are mounted with a SoC or an integrated circuit in a chip-on-chip configuration, a package-on-package configuration, or a multi-chip module configuration.

SoC 806 in the embodiment shown, as well as various ones of the other devices shown in FIG. 8, may include components of a communications system having a receiver as discussed above. In some embodiments, two of the components shown in FIG. 8 may be arranged to communicate with each other over a link that includes, at one end if not both, a receiver in accordance with the disclosure herein. Such a receiver may include DFE circuitry as disclosed herein to, e.g., adjust thresholds for interpreting incoming symbols. The DFE circuitry may utilize a threshold circuit in a feed forward configuration as shown in, e.g., any of FIGS. 1-3, or any other embodiment that falls within the scope of this disclosure.

The peripherals 804 include any desired circuitry, depending on the type of system 800. For example, in one embodiment, peripherals 804 includes devices for various types of wireless communication, such as Wi-Fi, Bluetooth, cellular, global positioning system, etc. In some embodiments, the peripherals 804 also include additional storage, including RAM storage, solid state storage, or disk storage. The peripherals 804 include user interface devices such as a display screen, including touch display screens or multi-touch display screens, keyboard or other input devices, microphones, speakers, etc.

As illustrated, system 800 is shown to have application in a wide range of areas. For example, system 800 may be utilized as part of the chips, circuitry, components, etc., of a desktop computer 810, laptop computer 820, tablet computer 830, cellular or mobile phone 840, or television 850 (or set-top box coupled to a television). Also illustrated is a smartwatch and health monitoring device 860. In some embodiments, smartwatch 860 may include a variety of general-purpose computing related functions. For example, smartwatch 860 may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 800 may further be used as part of a cloud-based service(s) 870. For example, the previously mentioned devices, and/or other devices, may access computing resources in the cloud (i.e., remotely located hardware and/or software resources). Still further, system 800 may be utilized in one or more devices of a home other than those previously mentioned. For example, appliances within the home may monitor and detect conditions that warrant attention. For example, various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 8 is the application of system 800 to various modes of transportation. For example, system 800 may be used in the control and/or entertainment systems of aircraft, trains, buses, cars for hire, private automobiles, waterborne vessels from private boats to cruise liners, scooters (for rent or owned), and so on. In various cases, system 800 may be used to provide automated guidance (e.g., self-driving vehicles), general systems control, and otherwise. These any many other embodiments are possible and are contemplated. It is noted that the devices and applications illustrated in FIG. 8 are illustrative only and are not intended to be limiting. Other devices are possible and are contemplated.

It is noted that while the circuits discussed above have been implemented using NMOS and PMOS transistors, the disclosure is not intended to limit embodiments falling within its scope to these types of devices. Thus, in addition to various MOSFET types discussed above, the present disclosure also contemplates embodiments that use non-planar devices such as FinFETs, GAAFETs (Gate All Around FETs), among other types.

Embodiments implemented using Bipolar devices are also possible and contemplated. The disclosure further contemplates that technologies that are speculative as of this writing may be used to implement devices in various embodiments of the circuits discussed herein. These technologies include (but are not limited to) graphene transistors, carbon nanotube transistors, gallium arsenide transistors, and so on. The use of memristors in certain circuit structures is also contemplated.

The present disclosure includes references to "an" "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent claims that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise.

Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some tasks even if the structure is not currently being operated. Thus, an entity described or recited as being "configured to" perform some tasks refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. An apparatus, comprising:
    an amplifier circuit configured to:
        receive one or more signals that encode a serial data stream that includes a plurality of data symbols; and
        perform a comparison of the one or more signals to a threshold value to generate a recovered data symbol; and
    a threshold circuit configured to:
        generate a delayed version of the one or more signals;
        generate a delayed data symbol using the delayed version of the one or more signals; and
        adjust the threshold value using the delayed data symbol.

2. The apparatus of claim 1, wherein the threshold circuit includes:
    a delay circuit configured to apply hysteresis to the one or more signals to produce the delayed data symbol; and
    a logic circuit configured to, for a currently received symbol, select the threshold value for the amplifier circuit based on the delayed data symbol and an input code.

3. The apparatus of claim 2, wherein the delay circuit includes a Schmitt trigger.

4. The apparatus of claim 2, wherein the input code is a static code provided from a control register.

5. The apparatus of claim 2, wherein the input code is periodically updated based on a calibration.

6. The apparatus of claim 1, further comprising an level shifter configured to transfer a data symbol received from the amplifier circuit from a first voltage domain to a second voltage domain.

7. The apparatus of claim 1, wherein the threshold circuit is configured to change the threshold value from a first level to a second level at a first delay time subsequent to a transition of a recovered data symbol from a first logic value to a second logic value.

8. The apparatus of claim 7, wherein the threshold circuit is configured to change the threshold value from the second level to the first level at a second delay time subsequent to a transition of the recovered data symbol from the second logic value to the first logic value.

9. The apparatus of claim 8, wherein the second level is greater than the first level.

10. A method comprising
    receiving, by an amplifier circuit, one or more signals that encode a serial data stream that includes a plurality of data symbols;
    performing, using the amplifier circuit, a comparison of the one or more signals to a threshold value to generate a recovered data symbol;
    generating, using a threshold circuit, a delayed version of the one or more signals;
    generating, using the threshold circuit, a delayed data symbol using the delayed version of the one or more signals; and
    adjusting, using the threshold circuit, the threshold value using the delayed data symbol.

11. The method of claim 10, wherein the threshold circuit includes a delay circuit and a logic circuit, and wherein the method further comprises:

producing the delayed data symbol, using the delay circuit, wherein producing the delayed data symbol includes the delay circuit providing hysteresis to the one or more signal;

selecting a threshold value for a currently received data symbol using the logic circuit based on the delayed data symbol and an input code.

12. The method of claim 11, further comprising providing the input code, from a register, to the logic circuit.

13. The method of claim 11, further comprising performing a calibration to update the input code.

14. The method of claim 10, further comprising the threshold circuit changing the threshold value from a first level to a second level at a first delay time subsequent to a transition of a recovered data symbol from a first logic value to a second logic value.

15. The method of claim 14, further comprising the threshold circuit changing the threshold value from the second level to the first level at a second delay time subsequent to a transition of the recovered data symbol from the second logic value to the first logic value.

16. A system comprising:
- a transmitter circuit configured to transmit one or more signals that encode a serial data stream that includes a plurality of data symbols; and
- a receiver circuit configured to receive the one or more signals, wherein the receiver circuit includes:
  - an amplifier configured to compare voltage levels of the one or more signals to a threshold value and to generate a recovered data symbol based on the comparisons; and
  - a threshold circuit configured to generate, using a delayed version of the one or more signals, a delayed data symbol, and further configured to adjust the threshold value based on the delayed data symbol.

17. The system of claim 16, wherein the threshold circuit includes a Schmitt trigger configured to apply hysteresis to the one or more signals to produce the delayed data symbol.

18. The system of claim 17, wherein the threshold circuit further includes a logic circuit configured to, for a currently received symbol, select the threshold value for the amplifier based on the delayed data symbol and an input code.

19. The system of claim 18, wherein the system includes a calibration circuit configured to periodically update the input code based on a calibration.

20. The system of claim 16, wherein the threshold circuit is configured to change the threshold value from a first level to a second level at a first delay time subsequent to a transition of a recovered data symbol from a first logic value to a second logic value, and further configured to change the threshold value from the second level to the first level at a second delay time subsequent to a transition of the recovered data symbol from the second logic value to the first logic value.

* * * * *